United States Patent

Lilland et al.

[15] 3,693,901
[45] Sept. 26, 1972

[54] QUICK-CHANGE CARTRIDGE SPOOL

[72] Inventors: Larry L. Lilland; James T. Rumbaugh, both of Spirit Lake, Iowa

[73] Assignee: Berkley & Company, Inc., Spirit Lake, Iowa

[22] Filed: Nov. 1, 1968

[21] Appl. No.: 778,913

Related U.S. Application Data

[63] Continuation-in-part of Ser. No. 727,832, May 9, 1968, abandoned.

[52] U.S. Cl. ........................... 242/84.2 R, 242/129.7
[51] Int. Cl. .............................................. A01k 89/00
[58] Field of Search ............ 242/84.2, 84.2 A, 84.2 G, 84.21, 242/84.21 A, 129.7, 129.71, 129.72, 129.8, 128, 68.3

[56] References Cited

UNITED STATES PATENTS

| | | | |
|---|---|---|---|
| 1,956,631 | 5/1934 | Snyder | 242/128 |
| 1,959,159 | 5/1934 | Gollong | 242/129.7 X |
| 2,705,113 | 3/1955 | Bonanno | 242/84.21 |
| 3,023,978 | 3/1962 | Denison et al. | 242/84.2 A X |
| 3,254,861 | 6/1966 | Jahn | 242/84.21 |
| 3,337,157 | 8/1967 | Plog | 242/129.8 |

FOREIGN PATENTS OR APPLICATIONS 1,212,063  10/1959  France ................. 242/84.21

*Primary Examiner*—Billy S. Taylor
*Attorney*—Orrin M. Haugen

[57] ABSTRACT

An adapting arbor for use in combination with a spinning reel having a housing, a spindle or shaft mounted within said housing, and means for rotating a line engaging bail device relative to said shaft, with the line engaging means being arranged for axial rotation within said housing. The adapting arbor is arranged for receiving a line spool and consists of a boss with a flange disposed rearwardly of the boss, and is arranged to be universally received along the spindle or shaft of a wide variety of reel devices and is also adapted to receive and releasably retain a line-receiving spool thereon. The boss of the arbor preferably has a keyway along one surface and the flange portion preferably has a locking lug to engage the spool, the spool having a locking key formed along the inner portion of the center sleeve and a lug-receiving bore formed on the rear flange. The outer periphery of the boss has a plurality of pads to engage the interior of the spool, each pad comprising a resilient member protruding from the surface of the boss to provide firm contact with the core of the spool. In addition, drag brake means are provided for mounting along the core of the arbor for controlling relative rotation between the spindle and the line spool.

5 Claims, 7 Drawing Figures

PATENTED SEP 26 1972

INVENTORS
LARRY L. LILLAND,
JAMES T. RUMBAUGH
BY
Orrin M. Haugen
ATTORNEY

PATENTED SEP 26 1972
3,693,901
SHEET 2 OF 2
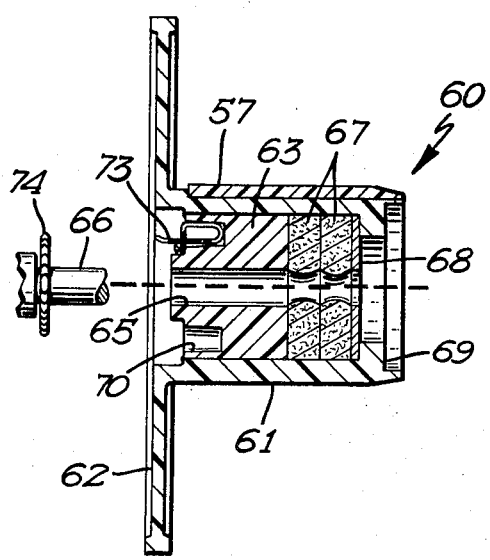
FIG 3
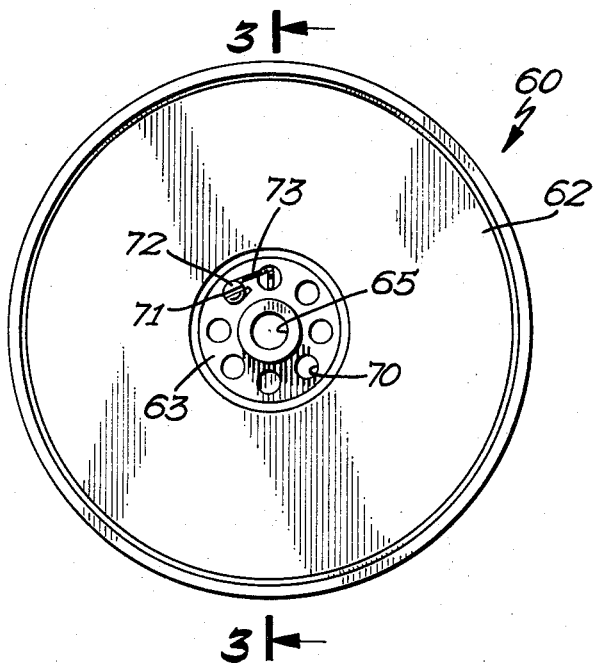
FIG 4
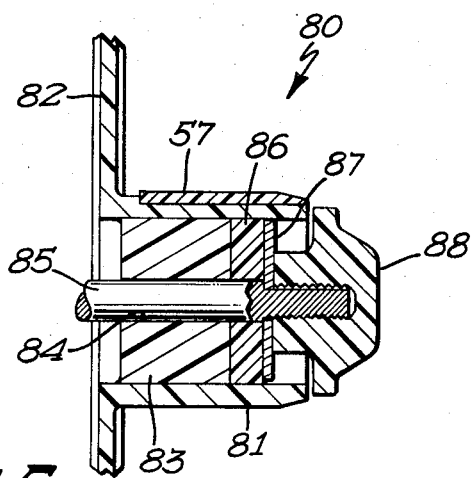
FIG 5
FIG 6
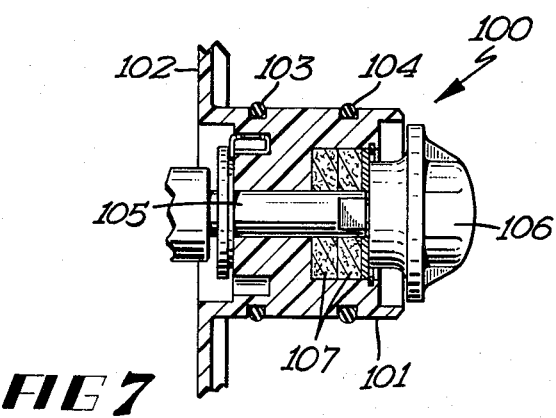
FIG 7
INVENTORS
LARRY L. LILLAND,
JAMES T. RUMBAUGH
BY
Orrin W. Haugen
ATTORNEY

QUICK-CHANGE CARTRIDGE SPOOL

This application is a continuation-in-part of our copending application Ser. No. 727,832, filed May 9, 1968, now abandoned.

The present invention relates generally to spinning reels, and more particularly to means for use in combination with a variety of spinning reels for adapting the reel for a ready interchange of line-receiving spools. Specifically, an adaptor in the form of an arbor having a central boss or hub and a flange is provided for frictional engagement with a drag brake mechanism which is preferably arranged in a bore formed in the interior of the boss, the exterior of the boss being provided with means to receive and retain a line-receiving spool in coaxial disposition thereon.

Spinning reels are utilized in a number of fishing environments. One feature of the spinning reel is its versatility and adaptability for a variety of fishing situations. For example, a single spinning reel structural design will permit its use for fishing pan fish as well as for fishing larger varieties of fish. The fisherman normally adjusts his line in accordance with the immediate fishing situation, and will ordinarily utilize a line weight which is as light as reasonably possible consistent with the variety of species of fish he is seeking. Therefore, as the fisherman changes his immediate fishing situation, he will wish to be able to change his line as well. The versatility of the present spinning reels does not extend to a line interchange situation, and hence the individual desiring to change lines may necessarily be required to substantially dismantle his spinning reel, or otherwise engage in time consuming operations to accomplish a change in the type of line spooled upon the reel.

In the dispensing of line, it is the current practice to vend line on an ordinary disposable spool, and this line is normally spooled upon the reel by the purchasing fisherman as required. Because of the difficulties inherent in this operation, the ordinary fisherman will generally prefer to obtain a single line with a strength or weight which is consistent with the heaviest duty expected. In accordance with the present invention, however, the line is dispensed and sold on a spool structure wherein the spool is arranged to be received on an adapting arbor which is in turn designed to be mounted on a variety of reels without drastically modifying either the reel or the adaptor. Therefore, after the adaptor is mounted on a reel, the line may be changed quickly, simply, and readily, without requiring any disassembly of the reel assembly or structure. The spool utilized to carry the line is provided with forward and rear flanges spaced apart by an axial sleeve or core, all of the line contacting surfaces being smooth, regular, and free of projections or indentions which could reasonably interfere with the winding of the line. Furthermore, the outer periphery of the flange portion of the adapting arbor has an overhanging lip which encompasses and confines the rear plate or flange of the spool, this structure preventing the line from entering the space between the rear surface of the rear flange of the spool and the forward surface of the flange of the adapting arbor.

In accordance with the present invention, a spinning reel is provided having a unique capability for a ready interchange of line, the capability being consistent with a minimum disassembly effort, along with a maximum degree of stability for the structure when it is assembled and ready for use. Briefly, the present invention provides an adapting arbor for removably mounting and releasably retaining a line-receiving spool coaxially thereon, the arbor being provided with a boss portion and a flange portion, each preferably having means for lockingly engaging the spool against relative rotation with the adapting arbor. Means are also provided along the boss or hub of the adapting arbor for frictionally engaging the inner periphery of a line engaging spool and thereby hold said spool in proper axial disposition along the adapting arbor. The boss or hub of the arbor structure is arranged so that a line engaging spool may be readily mounted thereon without necessitating any prior disassembly of any portion of the reel structure.

Therefore, it is an object of the present invention to provide an improved spinning reel structure wherein adapting arbor means are provided for mounting along the central shaft of a spinning reel, the adapting arbor being arranged to provide a ready interchange of line-receiving spools.

It is a further object of the present invention to provide an improved line spool receiving adapting arbor for mounting on a spinning reel structure, the arbor having a boss or hub means thereon adapted to hold a line-receiving spool and to lock the spool against axial relative rotation with the arbor, the arbor being further provided with means for frictionally resisting axial rotation of the adapting arbor relative to the spinning reel shaft.

Other and further objects of the present invention will become apparent to those skilled in the art upon a study of the following specification, appended claims, and accompanying drawings wherein:

FIG. 3 is a vertical sectional view of an adapting arbor fabricated in accordance with the present invention, the arbor receiving shaft of the reel being shown in exploded disposition, this view being taken along the line and in the direction of the arrows 3—3 of FIG. 4 and being slightly reduced in scale;

FIG. 4 is a rear elevational view of an adapting arbor device prepared in accordance with the present invention;

FIG. 5 is a detail vertical sectional view partially broken away of the adapting arbor shown in FIGS. 3 and 4, but with a modified form of drag mechanism being shown;

FIG. 6 is a view similar to FIG. 5 and illustrating still a further modification of adapting arbor and brake and click mechanism; and FIG. 7 is a view similar to FIGS. 5 and 6, and illustrating a still further modified form of the present invention.

Figure 1:
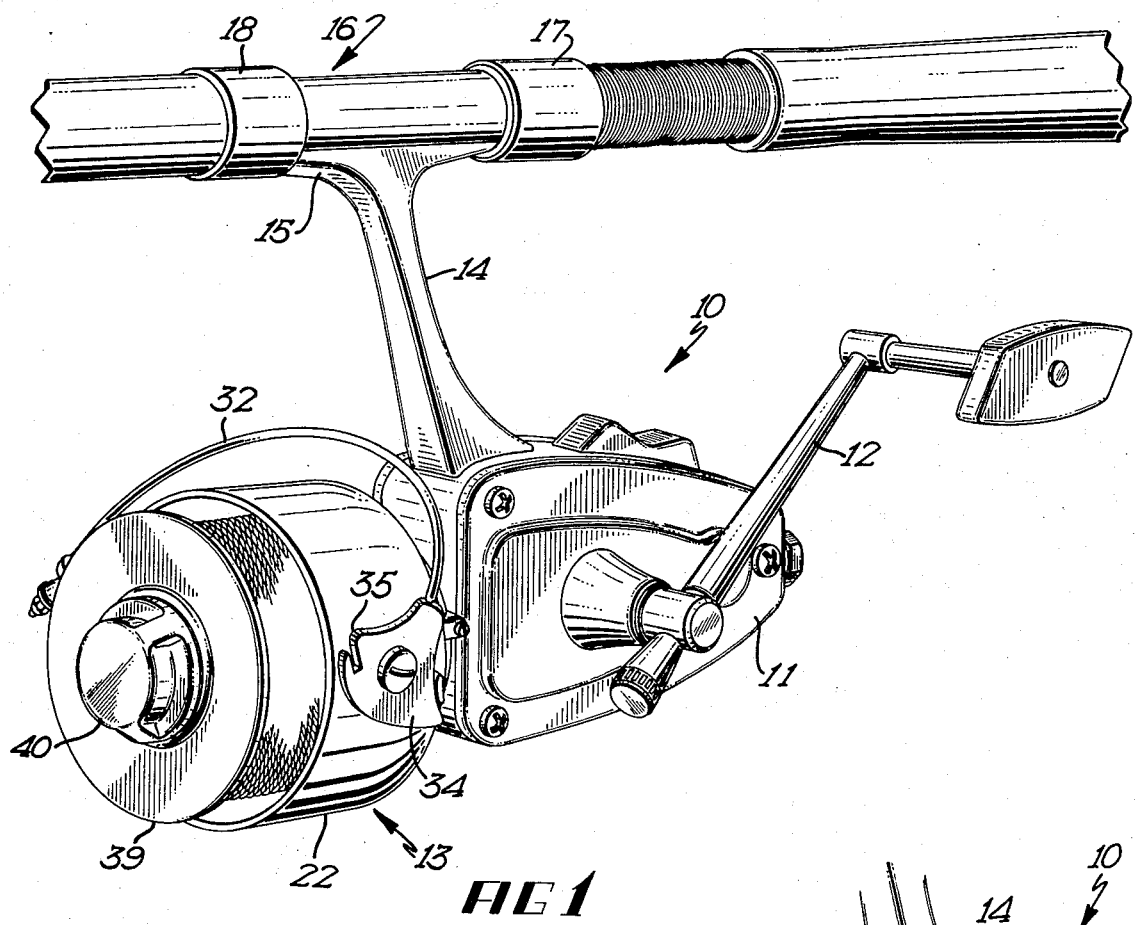
FIG. 1 is a perspective view illustrating the adaptor unit of the present invention as being mounted on a conventional fishing rod.

In accordance with the preferred modification of the present invention, the spinning reel generally designated 10 has a main housing 11 to which is attached the crank handle 12 and the spooling assembly shown generally at 13. The main housing 11 includes a bracket member 14 which terminates in a shoe 15 for mounting to the fishing rod shown generally at 16. Conventional attaching means such as the clamps 17 and 18 may be utilized to lockingly engage the extensions of the shoe 15 to clamp the reel 10 on to the rod 16.

Figure 2:
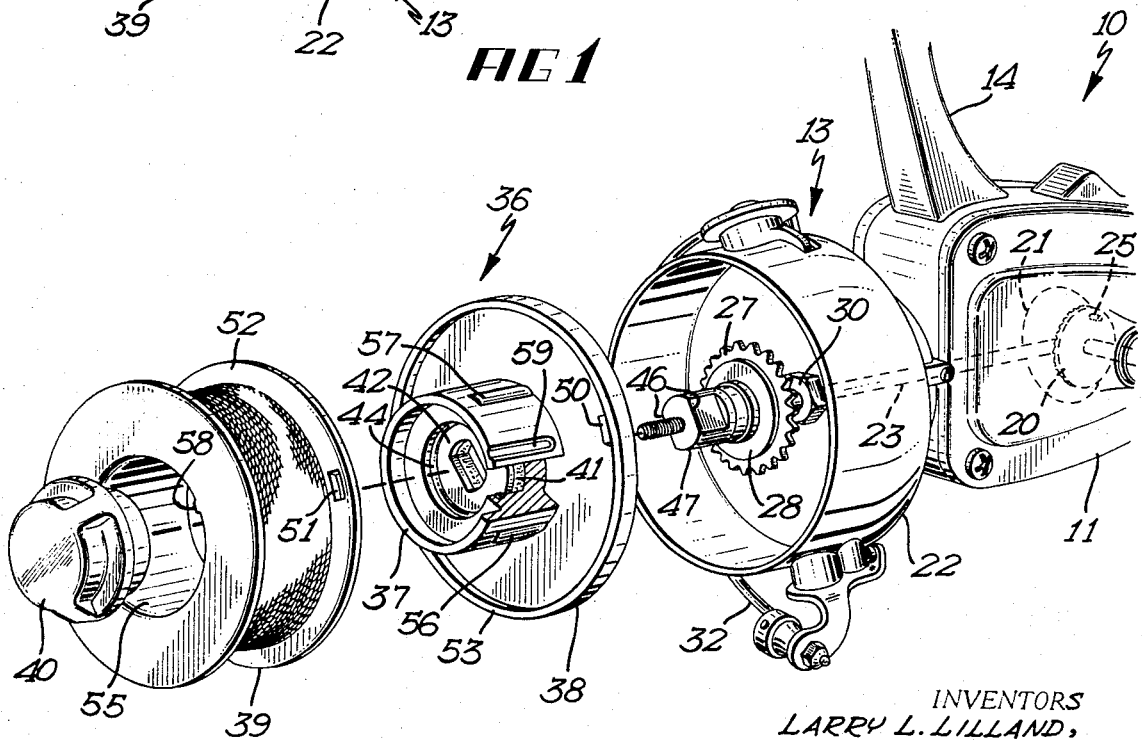
FIG. 2 is a perspective view showing the components of the reel in exploded disposition, certain of the components being partially broken away to illustrate internal features.

The operational features of the drive mechanism for the reel 10 are conventional. For example, as is illustrated in FIG. 2, the crank handle 12 is coupled to a drive gear 20 which meshes with the pinion 21, pinion 21 being secured or coupled at its opposite end to the spool cap 22. Also, as indicated in FIG. 2, pinion 21 is disposed coaxially with and about the shaft 23, shaft 23 being adapted to reciprocably oscillate during rotation of drive gear 20. On the inner face of drive gear 20, an eccentrically disposed dog is disposed as at 25, this dog engaging a slide guide member which is coupled to the shaft 23, and provides for the reciprocable oscillation thereof. Within the spool cap 22, and along the axial extent of shaft 23, a base collar 27 is disposed, base collar 27 having a friction washer such as the fiber washer 28 disposed adjacent thereto. The pinion nut 30 along with appropriate washers, couple the pinion gear 21 to the spool cap 22, and thus provide for rotation of the cap 22 together with simultaneous reciprocable oscillation of the shaft 23. As is conventional in spinning reels, the spool cap 22 is provided with a bail arm 32, bail arm 32 being coupled to spool cap 22 by appropriate means. The bail arm is adapted for pivotal rotation about its center axis, a bail hinge member 34 being provided to permit the bail arm 32 to be selectively disposed in either operational or retracted disposition. The bail arm 32 is provided with a notch as at 35 to permit engagement with a locking link or dog arm mechanism. Suitable hubs are provided in the spool cap 22, when required.

Turning now to the spool retaining portion of the device, an adapting arbor generally designated 36 is provided having a boss portion 37 and a rear flange 38, the boss portion 37 is adapted to receive spool 39 coaxially thereon. The drag adjusting knob 40 is utilized to control the frictional drag on the combined adaptor 36 and spool 39.

Turning now to the details of the adapting arbor 36, the boss portion 37 has a bore extending therethrough with a forward counterbore area in which there is disposed a frictional felt washer or washers 41, pressure plate 42 being utilized to apply axial compressional force to the washers 41 by virtue of the axial disposition of the threadedly adjustable drag adjusting knob 40. As can be readily ascertained, the axial disposition of drag adjusting knob 40 upon the threaded portion of shaft 23 will determine the compressional force applied to the felt washer or washers 41. In order to retain the drag system intact, a drag washer locking means such as locking spring 44 is utilized in a flanged termination of the internal bore within arbor 37. Obviously a variety of drag or brake systems may be utilized consistent with conventional reel design. These systems may also include or utilize the rear surface of flange 38 as a force applying surface or a frictional surface. Plate 42 is provided with a pair of parallelly arranged flat portions in the central opening formed therein, these flat portions being adapted to engage the corresponding flat portions 46–46 which are arranged along the axial extent of lug 47.

Turning now to the details of the design of the adaptor 36, the plate 38 is provided with a protruding lug 50 which is adapted to engage the port 51 which is formed in the rear flange 52 of spool 39. Port 51 provides a convenient line tying zone for winding the end of the line therethrough and thereafter tying the end for retention. Rear flange 52 of spool 39 is adapted to be received within the confines of the edge lip 53 which is disposed on the periphery of plate 38, lip 53 having an axial height which is capable of enveloping a substantial portion of the axial thickness of flange 52. The lug 50, when engaged in the port 51, prevents relative rotation of the spool 39 on the arbor 37. The core 55 of spool 39 is adapted to be received on the outer periphery of the boss portion of adapting arbor 37. A plurality of resilient lugs, such as lugs 56 and 57 being utilized to frictionally engage the interior of spool core 55 to prevent axial movement or displacement of the spool 39 when mounted upon the adapting adaptor 36. Preferably, three or more of these resilient lugs are provided, and when three are available, axial binding occurs to limit or prevent undesired axial slipping or shifting of the spool on the adapting arbor.

As a further means for resisting uncontrolled axial rotation of the spool 39 relative to the boss portion 37 of the adapting arbor 36, a key is formed along the interior of the sleeve portion or core 55 of the spool 39, this key being shown at 58. A matching keyway 59 is formed within the outer periphery of the boss portion 37 of adapting arbor 36. This key-keyway combination provides for ready location of the locking lug 50 with port 51, and thereby permits mounting of a line spool on the adapting arbor under poor light conditions. It is generally preferable to mount the key portion on the spool since the formation of a keyway in the sleeve or core portion of the spool may tend to mechanically weaken the spool.

While various materials of construction may be utilized for adapting arbor 36 and spool 39, it has been found that a reasonably rigid durable material such as ABS molding composition may be utilized. This material is, of course, commercially available. Adapting arbor 36 may alternatively be metallic.

In order to provide a constant extent of "fill" of line upon spool 39, as illustrated in FIG. 2, the radial thickness of core 55 may be varied as required. Thus, regardless of the diameter of the line spooled upon spool 39, a constant radial extent of fill may be achieved and obtained.

The forward or free end of arbor 37 is preferably tapered in order to better accommodate the mounting of spool 39 upon arbor 37. The spool 39 is adapted to be disposed against the forward surface of plate 38, thereby permitting lip 53 to envelope a substantial portion of flange 52 of spool 39. This arrangement substantially eliminates any danger of line being fouled between the rear surface of flange 52 and the forward surface of plate 38.

The bore 51 is disposed adjacent the outer circumference of flange 52. This disposition provides for a more convenient tying aid, consistent with the locking requirements and over-all strength of the system.

The flanges of spool 39 have relatively smooth lip surfaces. This is necessary in order to eliminate any danger of abrasion of the line being played out from or being wound upon spool 39. In addition, the inner diameter of the core 55 is in excess of the extent of the outer diameter of drag adjusting knob 40, thereby permitting the removal or mounting of spool 39 without necessitating a change in the drag adjustment.

While the dimensions of the spool and adapting arbor system are not critical, it is generally preferred that the inner bore of the sleeve portion 55 of the device shown in FIGS. 1 and 2 be in the range of about 1.25 inches. This provides for reasonable line filling capabilities, and also for compatible drag adjustment systems. Therefore, the lower limit of the dimension of the core or sleeve portion of the spool is that certain dimension wherein the internal surface will just contact, meet or equal the outer diameter of the boss portion of the adapting arbor. A convenient diameter is 1.240 inches, and reasonable tolerance levels permit a reduction to about 1.220 inches, this being the diameter of the boss portion of the adapting arbor 36. On the other hand, the upper limit for the diameter of the sleeve portion 55 for the spool 39 is that certain diameter where the inner periphery of the spool makes initial contact with the resilient or elastomeric lugs extending or protruding from the outer peripheral surface of the boss portion 37 of the adapting arbor 36. For general purposes, and for most materials which have been found usable, this diameter may be in the range of about 1.312 inches for the system described hereinabove. While these dimensions are not critical to the operation of the system, they have been found to be convenient in designing this structure. The various fresh-water spinning reels which are in use at the present time utilize an axial "throw" in the level wind mechanism of between about 0.375 and 0.660 inches, with the average being in the range of about 0.5 inches. Thus, with a view toward providing universal adaptability, the spools being utilized have an inner line receiving core with an axial dimension of about 0.75 inches. This dimension is adequate to permit universal adaptability, without restricting the winding capabilities of the reels upon which this assembly is mounted.

Turning now to FIG. 3 of the drawings, the adapting arbor generally designated 60 includes a boss or hub portion 61 together with a rear flange portion 62. The operation of this device is substantially identical to that device shown in FIGS. 1 and 2 of the drawings, however this view shows the internal structure in greater detail. In this connection, the boss or hub portion is provided with a bore receiving a plug element 63, the plug element preferably being adhesively bonded to the internal surface of the bore formed in boss 61. The axis of plug 63 is provided with a bore 65 extending therethrough, bore 65 being capable of receiving the spinning reel shaft 66 therewithin. In order to render this structure more universally adaptable, a variety of plug members 63 may be made available, each with its individual dimensions including diameter of bore 65 and axial length. The forward surface of plug 63 is in contact with a pair of felt washers 67—67, the metallic pressure plate 68 being in surface-to-surface contact with the washers 67. A retaining flange 69 is shown at the forward end of the boss or hub portion 61 for retaining the drag washers 67—67 in place. A drag adjusting knob will, of course, be arranged to make contact with the pressure plate 68.

The plug 63 is provided with a plurality of radially disposed bores 70—70 for a purpose made manifest hereinafter. In the apparatus shown in FIGS. 3 and 4, however, one bore as at 71 is formed with a smaller diameter, and is shown with a screw 72 therein, screw 72 retaining wire 73 which forms a part of the click mechanism. Upon achieving relative rotation between the member 60 and the shaft 66, the wire 73 will engage individual teeth formed on the gear 74 and will generate an audible click to warn the user of this relative rotation.

Attention is now directed to FIG. 5 of the drawings wherein a modified form of adapting arbor is shown. This adapting arbor generally designated 80 includes a boss or hub 81 together with a flange 82, boss 81 having a core member 83 adhesively bonded therein. Core 83 is provided with a central shaft receiving bore 84 which receives shaft 85 in operative relationship therewithin. The resilient washer 86 is arranged to be in surface-to-surface contact with the pressure plate 87, pressure plate 87 being arranged to contact drag adjustment knob 88. Other features of this adapting arbor, including the resilient lugs 57 are essentially the same as those shown in the devices of FIGS. 1–4.

Attention is now directed to FIG. 6 of the drawing wherein a still further modified form of adapting arbor is shown, this form being generally designated 90 and including a boss or hub portion 91 together with a flange 92. Boss 91 carrying coaxially thereon a lug carrying ring 91a. Such a lug carrying ring enhances the versatility of the structure by permitting greater tolerances in the core diameter of the line receiving spool, and of the hub portion. A bore is formed in the center of the core 91, such as at 93, shaft 94 being retained within bore 93, and carrying knob adjusting screw 95 at the free end thereof. The shaft 94 further is provided with a plate 96, plate 96 carrying wire prong member 97 thereon. The wire prong member 97 engages the individual bores 98—98 which are formed similar to the bores 70—70 illustrated in connection with the device of FIGS. 3 and 4. The friction for the drag in this system is provided between the surface of the knob 95 and the front of boss or hub 91, as at 99, and the forwardly disposed surface of plate 96.

Attention is now directed to FIG. 7 of the drawing where a still further modification is illustrated, this modification being shown generally at 100. This unit is comprised of a boss or hub portion 101 together with a flange portion 102. The structure is generally similar to that shown in FIGS. 2 and 3 of the drawings, with the exception of the retaining means for the spool, this retaining means being in the form of a pair of axially spaced "O" rings 103 and 104. This adapting arbor is mounted on shaft 105, drag adjusting knob 106 being utilized to operate the drag adjusting means shown as at 107.

While this line loading concept has been shown in connection with an open-face spinning reel, it will, of course, be understood that a similar concept may be employed with closed-face or modified open-face spinning reels such as are in use today. Furthermore, adaptor 36 may be made compatible with other reel structures, the essential requirement being that plate 42 be compatible with the drag member 47.

What is claimed is:

1. In combination with a spinning reel having a housing, a shaft mounted within said housing, means for rotating a line engaging means relative to said shaft;
   a. adapting arbor means arranged to be disposed along said shaft for retaining a line receiving spool coaxially thereon, said adapting arbor having a spool receiving boss portion with a flange portion along the rear thereof, said flange having a locking lug projecting forwardly therefrom, said line receiving spool having front and rear flanges spaced apart by a central core sleeve, the rear flange having a lug receiving bore formed therein for receiving said lug in locked engagement for preventing axial rotation relative to said arbor, and the central core sleeve having a key formed axially along the inner surface thereof,
   b. drag means along said adapting arbor for frictionally engaging a surface of said arbor to provide a means to adjustably resist axial rotation of said arbor relative to said shaft,
   c. the outer periphery of said boss having a keyway for receiving the key formed on said spool, and at least one generally axially extending groove formed along the outer surface thereof for receiving a resilient spool engaging pad therein, the radial height of said resilient pad being greater than the depth of said groove, the arrangement being such that a line receiving spool disposed along said arbor sleeve engages said resilient pad for axial retention of said spool along said boss.

2. The combination as set forth in claim 1 being particularly characterized in that the lug receiving bore formed in said rear spool flange is disposed adjacent the outer circumference of said rear flange.

3. The combination as set forth in claim 1 being particularly characterized in that the flange portion of the adapting arbor has an outer lip disposed therealong, the axial extent of said lip being substantially equal to the axial thickness of the rear flange of said spool.

4. The combination as set forth in claim 1 being particularly characterized in that the locking lug on said flange has a height substantially equal to the axial thickness of the rear flange of the spool.

5. In combination with a line spool receiving adapting arbor for spinning reels having drag means arranged for resisting rotation of said adapting arbor and locking means for engaging said spool to prevent relative rotation between said spool and said adapting arbor, and resilient means disposed along said arbor for resisting uncontrolled axial displacement of said spool relative to said arbor;
   a. a line receiving spool having a central core sleeve for mounting on said adaptor and having front and rear annular flanges coupled to said core sleeve; said spool having means for engaging said locking means formed along an adapting arbor contacting surface thereof; and
   b. said adaptor being provided with a core receiving bore along the central axis thereof, and a plug is adhesively bonded within said bore, said plug having a central bore formed therein for mounting said adapting arbor on to a reel shaft.

* * * * *